No. 617,714. Patented Jan. 17, 1899.
C. S. BRADLEY.
ELECTRIC CONDENSER.
(Application filed Dec. 16, 1897.)
(No Model.)
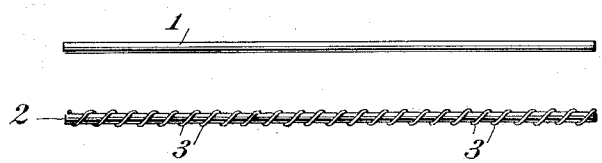
Fig. 3,
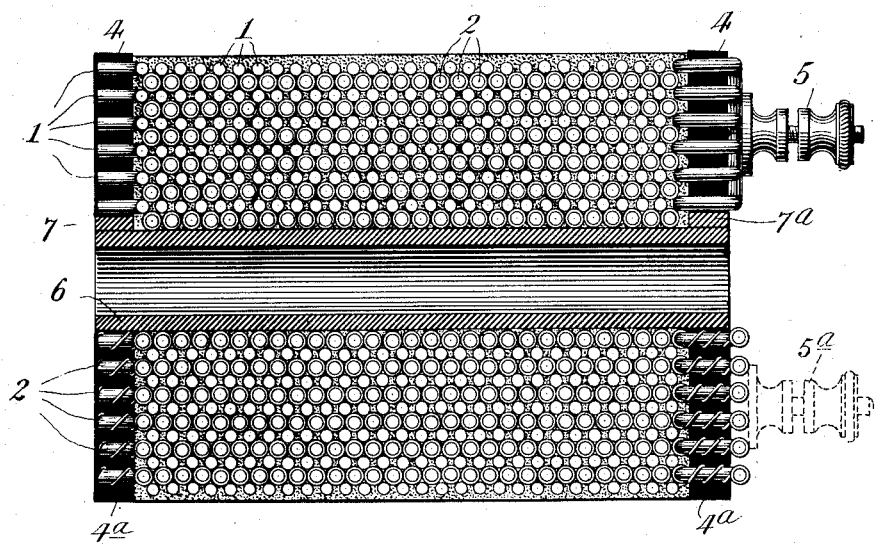
Fig. 1,
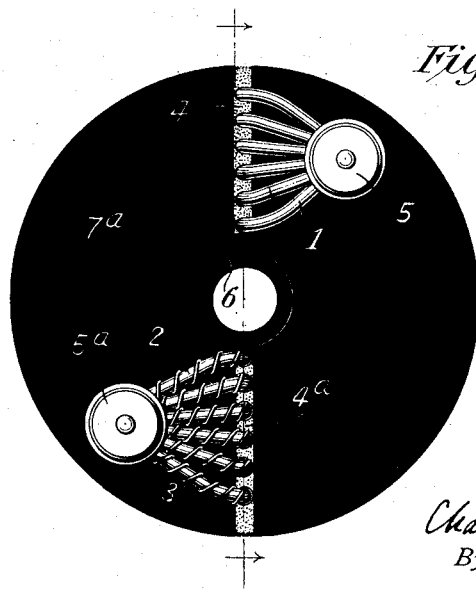
Fig. 2,
WITNESSES:
C. E. Ashley
H. W. Lloyd
INVENTOR:
Charles S. Bradley
By his Attorney

UNITED STATES PATENT OFFICE.

CHARLES S. BRADLEY, OF AVON, NEW YORK.

ELECTRIC CONDENSER.

SPECIFICATION forming part of Letters Patent No. 617,714, dated January 17, 1899.

Application filed December 16, 1897. Serial No. 662,168. (No model.)

*To all whom it may concern:*

Be it known that I, CHARLES S. BRADLEY, electrical engineer, a citizen of the United States, and a resident of Avon, county of Livingston, State of New York, have invented certain new and useful Improvements in Electric Condensers, of which the following is a specification.

This invention relates to electric condensers.

The object of the invention is to provide a condenser which will be cheap of construction and will have a uniform thickness of the dielectric between the opposing surfaces.

In carrying out the invention in the preferred form I wind upon a bobbin two conducting-wires, preferably arranged in alternate layers, one of said wires being wrapped with thread, the several convolutions of which are separated from one another, so as to leave open spaces between them, and the other wire being bare. The wires may, if desired, be coated before winding by the material which is to constitute the dielectric of the condenser and afterward immersed in a hot bath of the same, so as to permit the fluid material to penetrate all the pores or interspaces between the condenser-surfaces. The ends of the several layers are taken out upon the heads of the bobbin, the several ends of the spirally-wound conductors being connected to a common terminal and the ends of the bare conductors being connected with an independent terminal. The two terminals are adapted for connection with the two separate wires of an electric circuit.

My invention comprises a condenser the two surfaces of which are separated by a thin cord or thread wound about one of them. It comprises also a condenser formed of a plurality of wires wound in close relation, so as to lie adjacent to one another, one of said wires or one group of the same being wound with an open spiral of insulating material to form a spacing medium which will prevent mechanical contact of the two metallic surfaces with one another. It comprises also other more specific features, the novelty of which will be hereinafter indicated in the claims.

In the accompanying drawings, which illustrate my invention, Figure 1 is a sectional view, part in elevation, of a condenser embodying my improvements. Fig. 2 is an end view of the same. Fig. 3 is a detail view of a portion of two wires used to constitute the condensing-surface.

1 and 2 represent two conductors which may be of any desired shape in cross-section—as, for example, flat, in the form of ribbon, or square or round wire. One of these conductors, as 2, is wound with a fine thread of insulating material, (indicated at 3,) the several convolutions of the thread being separated from one another by wide open spaces, thereby admitting but a slight quantity of the insulating-thread, which has a comparatively low specific inductive capacity, to be employed and permitting most of the interspacing between the two conductors to be of a dielectric of high specific inductive capacity. For the latter I prefer to employ as the dielectric stearate of lead, which has an extraordinarily high specific inductive capacity, but which being waxy in nature and consistency is not suitable for a mechanical spacing medium between the two conductors which form the condensing-surfaces by reason of the softening when the condenser heats and also because of the difficulty of getting a film of uniform thickness. The conductors are wound in alternate layers, as indicated in Fig. 1, the ends being anchored in slots 4 4ª in each head of the bobbin, the ends of the thread-covered wire being anchored in the slot 4ª and the bare wire in the slot 4. The terminals of the several layers of each kind of wire are connected with a common binding-post 5 5ª, with which connection may be made with an external circuit. On the other end of the bobbin the several conductors of each kind of wire may be similarly grouped or left open, as desired. After winding a sufficient number of layers to form a condenser of the desired capacity the spool is immersed in a hot bath of the material which is to constitute the dielectric, and to facilitate infiltration of the same in the fine interspaces between the layers and between the thread convolutions the air may be exhausted from the vessel in which the spool is immersed. After cooling the condenser may be removed from the vessel and the excess of the dielectric trimmed off. The body of the bobbin may be formed of any suitable insulating material which will withstand the heat of the bath, and may be formed, as indicated in Fig. 1, of a hollow core 6 and slotted heads 7 7ª pressed over the same. It will thus be seen that a very uniform spacer is provided, which will at all times hold the condensing-surfaces in the same relation to each other, and at the same time but a small portion of the electrostatic field is obstructed by such spacer. This is an important consideration, since any available cheap spacing medium which will remain uninfluenced by the heat of the condenser when acting under high-pressure currents has a relatively low specific inductive capacity, and it is therefore desirable to fill such electrostatic field as much as possible with the best dielectric—such, for example, as stearate of lead, above mentioned.

Having thus described my invention, what I claim as new, and desire to secure by Letters Patent, is—

1. A condenser composed of two conducting-surfaces separated from one another by a spacer or thread of insulating material wound or peripherally arranged to leave spaces between the several turns of the thread.

2. A condenser composed of two conducting-surfaces separated from one another by a spacer or thread of insulating material wound or peripherally arranged to leave spaces between the several turns and having the interspaces between the two conductors and the turns of the spacer a dielectric of high specific inductive capacity.

3. An electric condenser composed of wires wound adjacent to one another and kept from electric contact by an open spiral of insulating material wound about one of them.

4. An electric condenser composed of two conductors wound in adjacent relation and in a plurality of layers upon a spool or bobbin and having a separating medium of insulating-thread wound about the conductors in open spirals, whereby relatively large spaces are left between the several convolutions, and a common connection for the several conductors of each group which forms one surface of the condenser.

In testimony whereof I have hereunto subscribed my name this 2d day of December, A. D. 1897.

CHARLES S. BRADLEY.

Witnesses:
EUGENE SONDHEIM,
ROBT. H. READ.